United States Patent [19]

Murata

[11] Patent Number: 4,947,077
[45] Date of Patent: Aug. 7, 1990

[54] DRIVE APPARATUS AND MOTOR UNIT USING THE SAME

[75] Inventor: Takeo Murata, Yokohama, Japan
[73] Assignee: JGC Corporation, Tokyo, Japan
[21] Appl. No.: 249,186
[22] PCT Filed: Jul. 31, 1987
[86] PCT No.: PCT/JP87/00576
§ 371 Date: Jul. 29, 1988
§ 102(e) Date: Jul. 29, 1988
[87] PCT Pub. No.: WO88/04492
PCT Pub. Date: Jun. 16, 1988

[30] Foreign Application Priority Data

Dec. 3, 1986 [JP] Japan .................. 61-286756
Dec. 12, 1986 [JP] Japan .................. 61-295044

[51] Int. Cl.$^5$ .................................... H01L 41/08
[52] U.S. Cl. ............................. 310/328; 310/317; 310/323
[58] Field of Search ............... 310/323, 328, 330–332, 310/317

[56] References Cited

U.S. PATENT DOCUMENTS

| 2,439,499 | 4/1948 | Williams et al. ............... 310/331 |
| 3,204,133 | 8/1965 | Tschudin ....................... 310/331 X |
| 3,902,084 | 8/1975 | May, Jr. ........................... 310/328 |
| 4,056,743 | 11/1977 | Clifford et al. ................. 310/330 X |
| 4,339,682 | 7/1982 | Toda et al. ..................... 310/328 X |
| 4,622,483 | 11/1986 | Staufenberg, Jr. et al. .... 310/331 X |
| 4,678,955 | 7/1987 | Toda ................................ 310/328 |
| 4,742,260 | 5/1988 | Shimizu ......................... 310/331 X |
| 4,782,262 | 11/1988 | Oka ................................ 310/323 |
| 4,801,829 | 1/1989 | Baba .............................. 310/328 X |
| 4,811,246 | 3/1989 | Fitzgerald, Jr. et al. ....... 310/328 X |

FOREIGN PATENT DOCUMENTS

| 1066345 | 11/1979 | Canada .............................. 310/328 |
| 57-170094 | 10/1982 | Japan ................................ 310/328 |
| 0042268 | 2/1986 | Japan ................................ 310/328 |
| 0177155 | 8/1986 | Japan ................................ 310/328 |
| 0180583 | 8/1986 | Japan ................................ 310/328 |
| 0180584 | 8/1986 | Japan ................................ 310/328 |

Primary Examiner—Mark O. Budd
Attorney, Agent, or Firm—Bucknam and Archer

[57] ABSTRACT

A drive apparatus uses a plurality of actuators such as multilayer type piezoelectric actuators and a displacement coupling means for coupling the displacements of the actuators at different angles and outputting the obtained displacement. The plurality of actuators are driven by alternating current signals that are in synchronism with each other so that a motion output end can move along a desired curve. When one or a plurality of such drive apparatuses are used and outputs of the respective drive apparatuses are transmitted to a moving part or the like through a non-contact power transmitting means using magnetic poles or the like, a high-reliability motor unit having a resolution on the order of submicrons is realized.

20 Claims, 9 Drawing Sheets

FIG. 2b — MOTION OF Q
FIG. 2c — SYNTHETIC MOTION OF PQ
FIG. 2a — MOTION OF P

DRIVE APPARATUS AND MOTOR UNIT USING THE SAME

TECHNICAL FIELD

The present invention relates to a drive apparatus and, more particularly, to a drive apparatus wherein displacements of a plurality of actuators are coupled at different angles to enable position control on the order of submicrons and a motor unit using such a drive apparatus.

BACKGROUND ART

Figure 20:
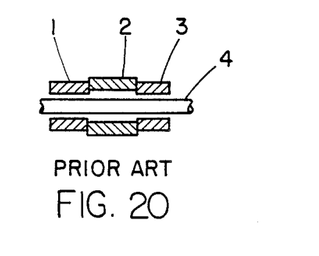
FIG. 20 is a view for explaining a conventional drive apparatus.

FIG. 20 shows a position control drive apparatus disclosed in U.S. Pat. Nos. 3,902,084 and 3,902,085 and known as an inch worm. The drive apparatus shown in FIG. 20 has three tubular piezoelectric elements 1, 2, and 3 and a shaft 4. When a control voltage is applied, the piezoelectric elements 1 and 3 are deformed to be fixed by the shaft 4 and the piezoelectric element 2 is deformed to extend along the axial direction of the shaft 4. With this arrangement, when the phases of the AC voltages applied to the piezoelectric elements 1, 2, and 3 are appropriately shifted from each other, the shaft 4 can be displaced relative to the piezoelectric elements 1, 2, and 3. When such an apparatus is used, position control on the order of submicrons can be performed. The step size can be changed in accordance with the voltages to be applied, and the moving speed reaches as high as 0.2 mm/sec.

With the arrangement of FIG. 20, however, since friction is utilized, abrasion, slippage, and play can occur. Therefore, it is difficult to perform precise position control and to maintain reliability.

Another apparatus is reported wherein clamping is performed utilizing electromagnets in place of the piezoelectric elements 1 and 3 shown in FIG. 20. In this case, however, heat generated by the coils of the electromagnets degrades the position control precision.

Furthermore, a stepping motor is widely used for such precise position control. In this case, however, heat generated by the coil of the stepping motor degrades the position control precision. If a gear is utilized to decrease the step size, a backlash occurs.

The present applicant previously proposed a so-called relay-type piezoelectric motor in Japanese Unexamined Patent Publication Nos. 61-185078 and 61-185079. According to this relay-type piezoelectric motor, a plurality of piezoelectric actuators are vibrated by voltages having a plurality of phases, and the vibration is transmitted to a moving part (or a rotor) through magnetic coupling. The arrangement of the actuators and the moving part and the phase of the drive signal are set such that the coupling of the actuator and the moving part is maximum in a phase in which the vibrating direction of the actuator coincides with the moving direction of the moving part. The actuators are sequentially coupled with the moving part with the maximum coupling degree and drive the moving part in a predetermined direction. However, when bimorph actuators are used as the piezoelectric actuators, as in this case, the drive force is small and thus the application is limited.

When two- or three-dimensional positioning is performed utilizing the apparatus as shown in FIG. 20, and particularly when a desired position is to be obtained in a trial-and-error manner, positioning generally takes time. Also, drive apparatuses must be separately provided for X, Y, and Z directions, resulting in a complex, expensive control system.

The present invention has been made in consideration of the above situation and has as its object to provide a drive apparatus which can perform fine driving along a desired curve with a simple arrangement.

It is another object of the present invention to provide a drive apparatus which can perform fine driving with a simple arrangement, which can perform driving with both a synchronous motor and an induction motor, and which has a wide application range.

It is still another object of the present invention to provide a high-resolution, high-reliability motor unit which can perform more precise positioning by utilizing such a drive apparatus.

It is still another object of the present invention to increase the drive force of a motor unit of this type.

DISCLOSURE OF INVENTION

The drive apparatus according to the present invention uses a plurality of multilayer type piezoelectric actuators and a displacement synthesizing mechanism for synthesizing the displacements of these actuators with different angles and outputting the synthetic displacement or a displacement coupling mechanism for coupling the displacements of these actuators at different angles and having a variable coupling degree. The respective actuators are driven by AC signals that are in synchronism with each other or AC signals having phases of a predetermined relationship with each other.

The present invention provides a motor unit wherein a magnetic head having a pair or a plurality of pairs of magnetic poles is provided to a motion output end of such a drive apparatus, and a moving part opposing the magnetic head and driving a plurality of magnetic poles arranged at a predetermined pitch is provided. When the motion of the magnetic head of the drive apparatus is magnetically transmitted to the magnetic poles of the moving part in a non-contact manner, the moving part can perform a desired infinite motion.

In the drive apparatus described above, when the actuators are driven by, e.g., AC signals having predetermined phase differences from each other, the displacements of the actuators are synthesized at different angles and the synthetic displacement is the output. Therefore, when the phases of the drive signals applied to the respective actuators are appropriately selected, the motion output end move reciprocally along a predetermined curve. When the motion of the drive apparatus is magnetically transmitted to the moving part, the moving part can perform an infinite motion.

In this drive apparatus, when the respective actuators are driven by AC signals having phases of predetermined differences from each other, the displacements of the actuators are synthesized at different reciprocate angles and the synthetic displacement is the output. Therefore, when the waveforms and phases of the drive signals applied to the respective actuators are appropriately selected, the magnetic pole of the motion output end can be moved along a desired closed curve. When such a motion of the magnetic pole is magnetically transmitted to the moving part, the moving part can perform an infinite motion.

In the drive apparatus according to the present invention, of the plurality of actuators, at least one can be arranged at the driven member side and at least another one can be arranged at the drive member side in order to move in a direction different from that of the actuator arranged at the driven member side. When the displacements of these actuators are magnetically coupled in a non-contact manner and the coupling degree is changed in relation to the moving direction of the actuator of at least either the drive or drive member side, the drive and driven members move relative to each other. When a plurality of such drive apparatuses are used, a motor unit whose moving part can perform an infinite motion can be obtained.

BEST MODE OF CARRYING OUT THE INVENTION

Figure 1:
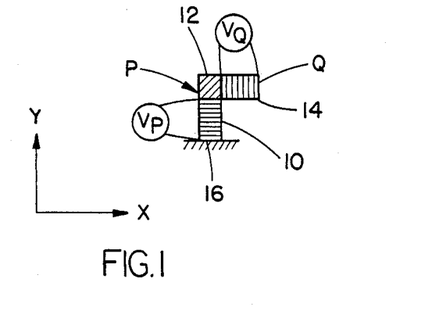
FIG. 1 is a schematic view for explaining a drive apparatus according to an embodiment of the present invention.

FIG. 1 is a schematic view of a drive apparatus according to an embodiment of the present invention In this apparatus, a multilayer type piezoelectric actuator 14 is attached on a motion end P of a multilayer type piezoelectric actuator 10 of a type different from the actuator 14 through a connection member 12 such that the moving directions of the actuators 12 and 14 are different from each other In FIG. 1, the actuators 10 and 14 are arranged such that their moving directions are perpendicular to each other. The other end of the actuator 10 is fixed to a stationary base 16.

With this arrangement, AC voltages VP and VQ, having predetermined phases and different frequencies and in synchronism with each other, are applied to the actuators 10 and 14, respectively. As a result, a motion end Q of the actuator 14 move reciprocally along a specific trace.

Figure 2A:
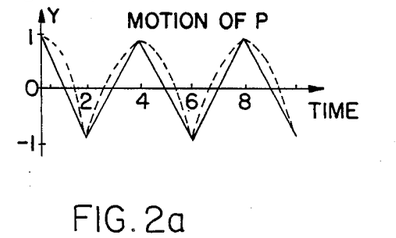
FIGS. 2 shows graphs of the operation of the apparatus shown FIG. 1.
Figure 2B:
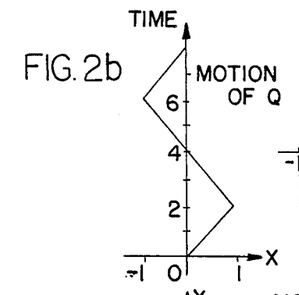
Figure 2C:
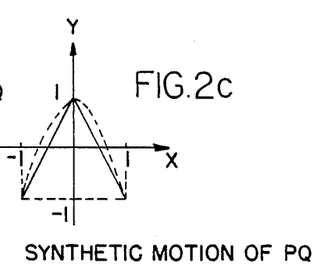

For example, assume that a triangular wave is applied as the voltage VP and that a triangular wave having a period twice that of the voltage VP is applied as the voltage VQ, as shown in FIG. 2. In this case, the motion end P of the actuator 10 vibrates in the vertical direction, i.e., in the Y direction in a triangular wave manner along with the lapse of time, as shown in FIG. 2(a). The actuator 14 vibrates in the horizontal direction, i.e., in the X direction in a triangular wave manner along with the lapse of time, as shown in FIG. 2(b). The motion of the motion output end Q of the apparatus shown in FIG. 1 is the synthesis of the motions of the actuators 10 and 14 in the perpendicular direction, as shown in FIG. 2(c).

Figure 3:
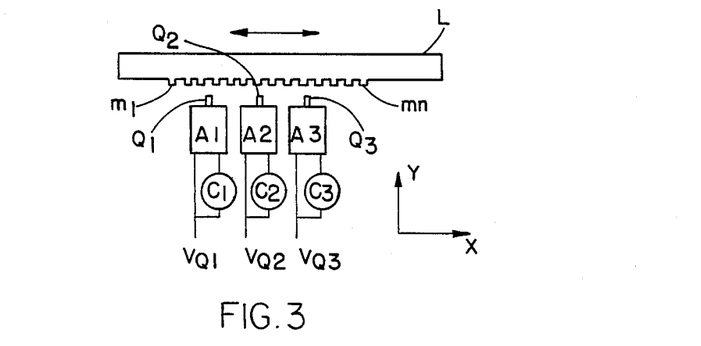
FIG. 3 is a schematic view for explaining a motor unit using the apparatus shown in FIG. 1.

When the voltage waveform applied to the actuator 10 is changed such that the motion end P moves as indicated by the broken line in FIG. 2(a), the synthetic motion of the motion output end Q of the apparatus shown in FIG. 1 provides a trace which is moderate in the Y direction in the vicinity of a point X=0 and which has a component in the X direction, as indicated by the broken line in FIG. 2(c). When the motion of the motion output end of the drive apparatus having such a motion trace in, e.g., the vicinity of a point X=0 is magnetically transmitted to a moving part, a motor unit which can perform an infinite motion can be realized FIG. 3 shows an example of such a motor unit. The motor shown in FIG. 3 has a moving part L and drive apparatuses A1, A2, and A3 each having the arrangement shown in FIG. 1. Magnetic heads Q1, Q2, and Q3 are mounted on the motion output ends of the drive apparatuses A1, A2, and A3, respectively, and magnetic poles m1, m2,..., and mn are mounted on the moving part L at equal intervals. Reference symbols C1, C2, and C3 denote converters for doubling the frequencies of the input signal voltages, respectively, and are connected to the drive apparatuses A2, A2, and A3, respectively. The interval of the magnetic poles m1, m2,..., and mn provided to the moving part L is different from the interval of the magnetic heads Q1, Q2, and Q3 of the driving apparatuses.

In the unit shown in FIG. 3, when input signal voltages VQ1, VQ2, and VQ3 applied to the drive apparatuses A1, A2, and A3, respectively, are AC voltages having phase differences of $2\pi/3$ rad from each other, the moving part L can be moved infinitely in the X direction. Note that the moving part L is restricted to move linearly only in the X direction. In this case, the magnetic heads Q1, Q2, and Q3 of the motion output ends of the drive apparatuses A1, A2, and A3 move as shown in FIG. 2(c) and transmit the drive force to the moving part L through the magnetic coupling with the magnetic poles m1, m2,..., and mn of the moving part L in a non-contact manner.

Figure 4A:
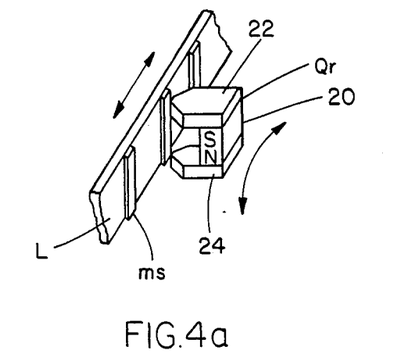
FIGS. 4(a) and 4(b) are perspective views, respectively, showing a practical example of a magnetic pole portion used in the motor unit shown in FIG. 3.

FIG. 4 shows practical examples of a magnetic pole portion for obtaining magnetic coupling between the moving part L and the respective drive apparatuses A1, A2, and A3 of the motor unit shown in FIG. 3. In FIG. 4(a), as a magnetic head Qr mounted on the motion output end of the drive apparatus, one having a U shape and consisting of a permanent magnet 20 and yokes 22 and 24 made of a soft magnetic material is used The distal end of each of the yokes 22 and 24 is arranged close to the corresponding magnetic pole ms of the moving part L.

Figure 4B:
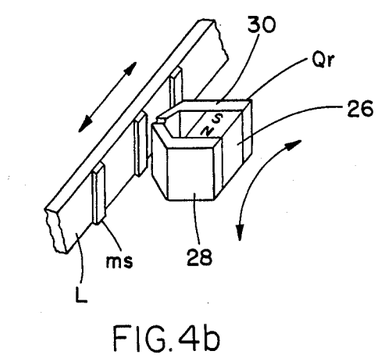

In FIG. 4(b), as the magnetic head Qr mounted on the motion output end of the drive apparatus, a gap-type magnetic pole consisting of a permanent magnet 26 and yokes 28 and 30 made of a soft magnetic material is used. The yokes 28 and 30 define a gap at a position opposite the magnetic pole ms of the moving part L the yokes 28 and 30 and the magnetic pole ms opposite the gap constitute a magnetic circuit.

In the motor unit described above, a magnetostrictive element, an electromagnetic drive apparatus or the like can be used as an actuator of the drive apparatus in place of the multilayer type piezoelectric actuator, and some actuators or part of the drive apparatus can be replaced by actuators of a type different from those described above. When a rotor is used in place of a linear moving part, a motor unit which performs rotation can be realized. When a moving part movable along a curved surface is used, position control along a curved surface can be performed. In this case, a drive apparatus consisting of three actuators can be used.

Permanent magnets can be used as the magnetic poles m1, m2,..., and mn.

Figure 5:
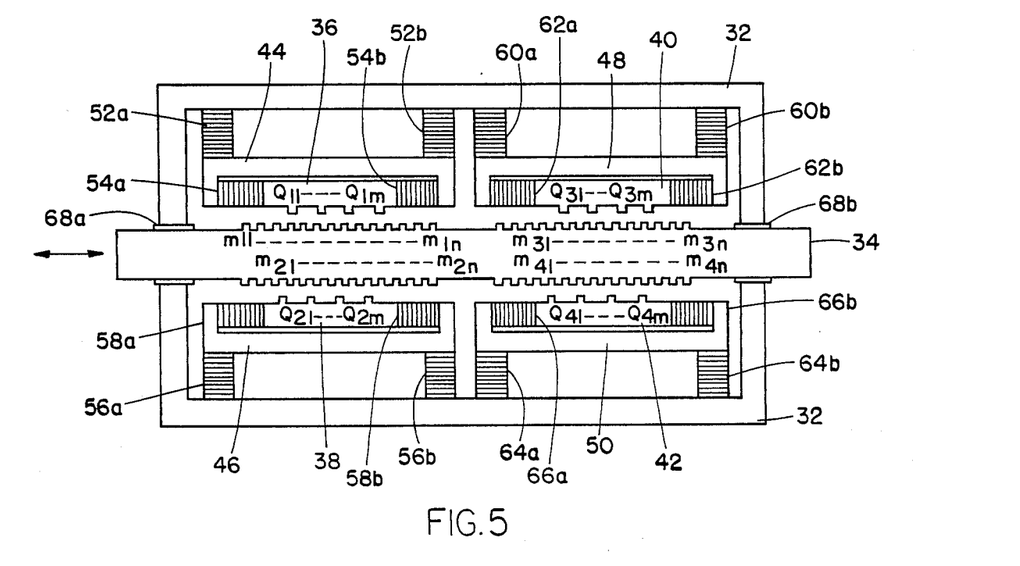
FIG. 5 is a sectional view for explaining a motor unit according to another embodiment of the present invention.

FIG. 5 shows a motor unit according to another embodiment of the present invention. The motor unit shown in FIG. 5 has an outer frame 32, a moving part 34, stators 36, 38, 40, and 42, auxiliary stators 44, 46, 48, and 50, multilayer type piezoelectric actuators 52a and 52b, 54a and 54b, 56a and 56b, 58a and 58b, 60a and 60b, 62a and 62b, 64a and 64b, and 66a and 66b, and bearings 68a and 68b. The actuators 52a and 52b are provided between the outer frame 32 and the auxiliary stator 44. The actuators 54a and 54b are provided between the auxiliary stator 44 and the stator 36. The actuators 56a and 56b are provided between the outer frame 32 and the auxiliary stator 46. The actuators 58a and 58b are provided between the auxiliary stator 46 and the stator 38. The actuators 60a and 60b are provided between the outer frame 32 and the auxiliary stator 48. The actuators 62a and 62b are provided between the auxiliary stator 48 and the stator 40. The actuators 64a and 64b are provided between the outer frame 32 and the auxiliary stator 50. The actuators 66a and 66b are provided between the auxiliary stator 50 and the stator 42. The bearings 68a and 68b are provided between the moving part 34 and the outer frame 32. The moving part 34 has magnetic poles m11, m12,..., and m1n; m21, m22,..., and m2n; m31, m32,..., and m3n; and m41, m42,..., and m4n. Magnetic heads Q11, Q12,..., and Q1m; Q21, Q22,..., and Q2m; Q31, Q32,..., and Q3m; and Q41, Q42,..., and Q4m are provided at portions of the stators 36, 38, 40 and 42, respectively that oppose the magnetic poles of the moving part 34 at an interval which is an integer multiple of the interval of the respective magnetic poles of the moving part 34. The interval of the magnetic poles of the moving part 34 and that of the respective magnetic heads of the stators 36, 38, 40, and 42 can be the same.

Figure 6:
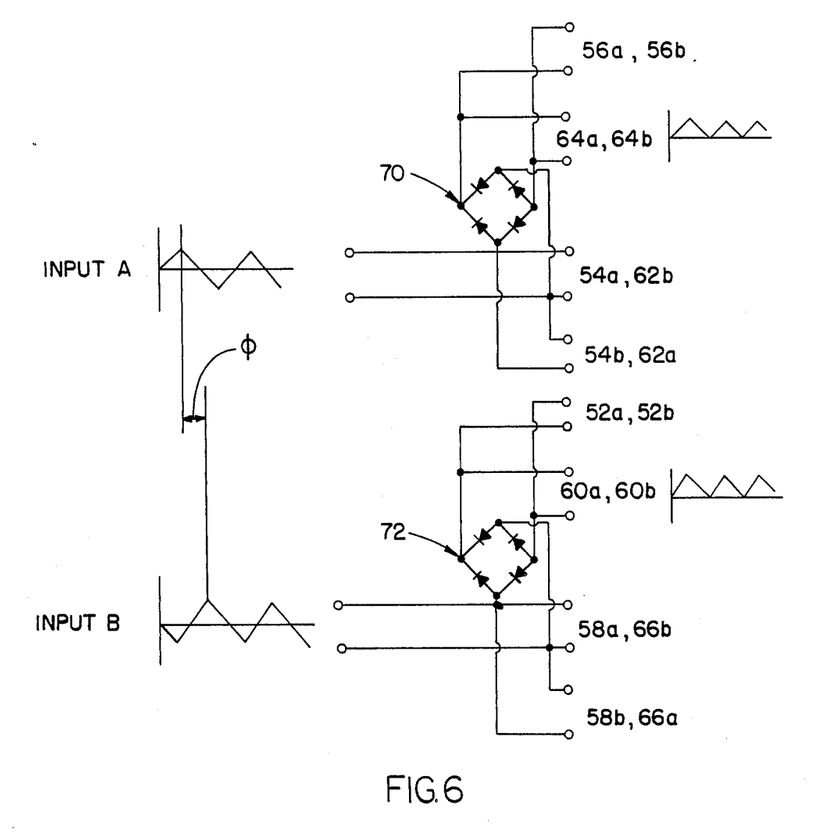
FIG. 6 is a circuit diagram showing a circuit for generating signal voltages to be applied to the respective portions of FIG. 5.

In the motor unit shown in FIG. 5, voltages having the same phases are applied to the actuators 52a and 52b; 56a and 56b; 60a and 60b; and 64a and 64b, as shown in FIG. 6, and voltages having inverted phases are applied to the actuators 54a and 54b; 58a and 58b; 62a and 62b; and 66a and 66b. The period of the AC voltages applied to the actuators 54a and 54a; 58a and 58b; 62a and 62b; and 66a and 66b is twice that of the voltages applied to the actuators 52a and 52b; 56a and 56b; 60a and 60b; and 64a and 64b. The voltages applied to the actuators 54a and 54b; and 52a and 52b are in synchronism with each other, and the voltages applied to the actuators 58a and 58b; and 56a and 56b are in synchronism with each other. The same applies to the actuators 62a and 62b; and 60a and 60b, and to the actuators 66a and 66b; and 64a and 64b. The voltages applied to the actuator 62a and 54a are phase-inverted with respect to each other, and the voltages applied to the actuators 66a and 58a are phase-inverted with respect to each other. A phase difference $\phi$ is provided between the voltages applied to the actuators 54a and 54b and those applied to the actuators 58a and 58b so that the moving part 34 can perform an infinite motion. The respective AC drive voltages described above are obtained by doubling the frequencies of input voltages A and B shown in FIG. 6 by diode bridges 70 and 72, respectively.

FIG. 7 shows another example of a magnetic pole portion used in the motor unit of the present invention which is different from that shown in FIG. 4.

Figure 7A:
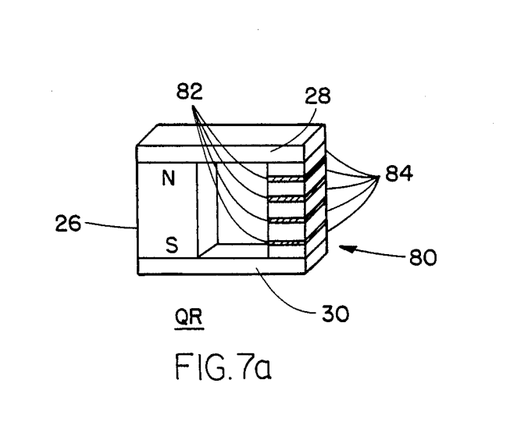
FIG. 7 shows perspective views, respectively, showing other practical examples of a magnetic pole portion use the drive apparatus and the motor unit according to the present invention.

A magnetic head Qr having a multilayer gap shown in FIG. 7(a) constitutes a U-shaped member together with a permanent magnet 26 and yokes 28 and 30 made of a soft magnetic material, in the same manner as in FIG. 4(b). An open portion of the U-shaped member is closed with an I-shaped multilayer member 80, thereby forming a square member The multilayer member 80 is obtained by alternately stacking nonmagnetic spacers 82 each having a thickness of g and magnetic elements 84 each having a thickness of d in the longitudinal direction of an I shape. The nonmagnetic spacers 82 form a plurality of gaps each having a thickness of g. A pair of magnetic poles appear to sandwich each gap.

Figure 7B:
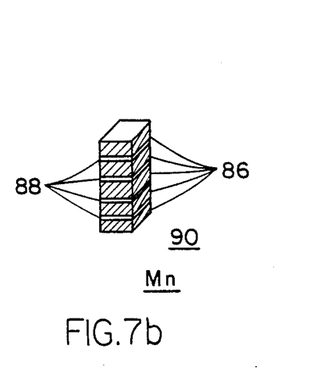

FIG. 7(b) shows a multilayer member 90 that forms a plurality of pairs of magnetic poles. The multilayer member 90 is obtained by alternately stacking nonmagnetic spacers 86 each having a thickness of G and magnetic elements 88 each having a thickness of D to form an I shape similar to the multilayer member 80. The nonmagnetic spacers 86 form a plurality of gaps each having a thickness of G. A pair of magnetic poles appear to sandwich each gap.

Iron (Fe) can be used as a magnetic material, and copper (Cu) can be used as a nonmagnetic material. The thicknesses of the spacer and element preferably satisfy $G \leq d$ and $D \geq g$.

Figure 8:
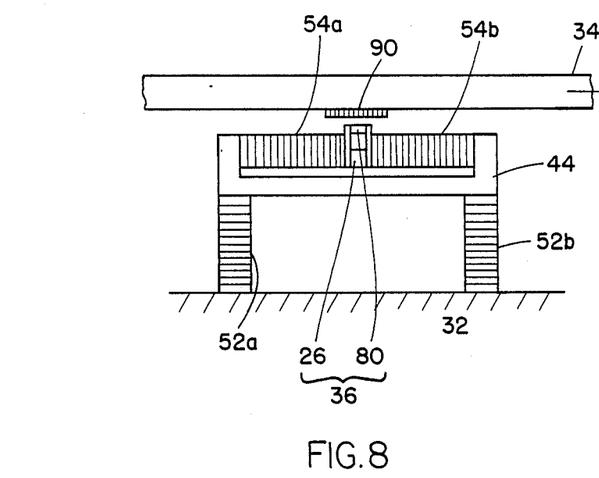
FIG. 8 a sectional view for explaining a motor unit according to still another embodiment of the present invention.

FIG. 8 shows one phase of a motor unit which uses the magnetic pole portion-, i.e., the magnetic head Qr and the magnetic pole Mn shown in FIG. 7 as its drive apparatus. The motor unit shown in FIG. 8 has a stationary frame 32, a moving part 34, a permanent magnet 26 and a multilayer member 80 constituting a magnetic head serving also as a stator 36, an auxiliary stator 44, and multilayer type piezoelectric actuators 52a and 52b; and 54a and 54b. The actuators 52a and 52b are provided between the stationary frame 32 and the auxiliary stator 44, and the actuators 54a and 54b are provided between the auxiliary stator 44 and the stator 36. A multilayer member 90 is fixed to the moving part 34 such that the longitudinal direction of the multilayer member 90 coincides with the moving direction of the moving part 34. The moving part 34 has pairs of magnetic poles, and each pair (two magnetic poles) corresponds to one spacer 86 of the multilayer member 90. The multilayer member 80 of the magnetic head is located to oppose the multilayer member 90 of the moving part 34.

The multilayer member 90 is obtained by stacking 200 copper foils each having 45 μm thick as the spacers 86 and 199 iron plates each having 5 μm thick as the elements 88. The multilayer member 80 is obtained by stacking 99 copper foils each having 5 μm thick as the spacers 82 and 100 iron plates each having 45 μm thick as the elements 84.

Assume that the drive apparatus shown in FIG. 8 is provided at four portions along the shaft of the moving part 34, in the same manner as in the motor unit shown in FIG. 5. When the distal end of each magnetic head Qr is caused to vibrate along an arcuate trace and when the phases of the vibrations of the respective drive apparatuses are shifted from each other by 90°, the moving part 34 can linearly move to the right or left in FIG. 8.

In the piezoelectric motor disclosed in Japanese Unexamined Patent Publication No. 61-185078 and the piezoelectric linear motor disclosed in Japanese Unexamined Patent Publication No. 61-185079 mentioned above, when vibrations having many phases are transmitted to a moving part (or a rotor) through magnetic coupling, a single magnetic pole is driven by a single piezoelectric actuator for each phase vibration, and the vibration is transmitted to magnetic poles arranged at the actuator of the moving part at a predetermined interval. In a multilayer type piezoelectric actuator, when it is directly driven without using a displacement amplifier, its vibration is as small as several tens μm or less. Therefore, the magnetic poles for transmitting the displacement must also be made small, and thus the number of magnetic fluxes handled by a single magnetic pole is small, resulting in a small transmission force. As a result, the application field of these piezoelectric actuators or the motor unit using the drive apparatus of the present application is conventionally limited.

However, when a plurality of magnetic poles are provided and are driven in an interlinked manner, as shown in FIGS. 7 and 8, the drive force of the motor unit can be increased in proportion to the number of poles to be driven in an interlinked manner. In this manner, when the drive force of the motor unit is increased, the application range of the fine drive utilizing a piezoelectric element is widened. The magnetic head and the magnetic poles of this type have a simple structure and are suitable for mass production. Since the drive force is increased, the offset during positioning is decreased, thus resulting in fine positioning.

Figure 9:
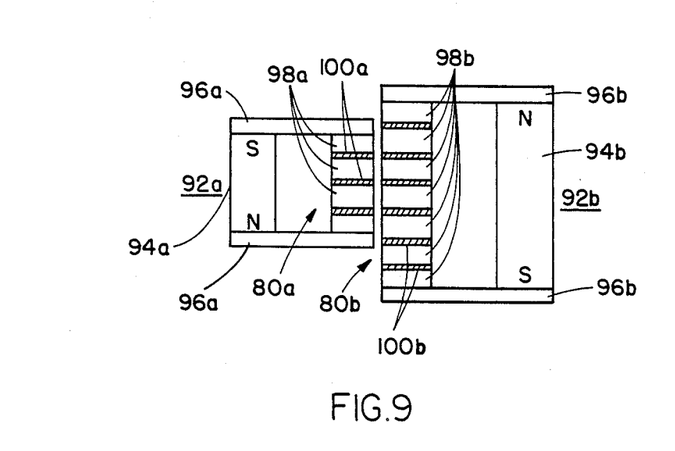
FIG. 9 is a side view of still another example of a magnetic used in the drive apparatus and the motor unit to the present invention.

FIG. 9 shows still another example of a magnetic pole portion used in the motor unit according to the present invention. In the arrangement shown in FIG. 9, magnetic heads 92a and 92b having the same structure as that of the magnetic head shown in FIG. 7(a) are mounted on the stator and the moving part, respectively, such that their multilayer members 80a and 80b oppose each other. In this case, the magnetic head mounted on the stator and that mounted on the moving part have the same gap structure. More specifically, the thicknesses of spacers 100a and 100b of the multilayer members 80a and 80b of the two magnetic heads, respectively, are the same, and those of the magnetic elements 98a and 98b are the same. However, the polarities of permanent magnets 94a and 94b are set such that the polarities of the magnetic poles appearing to sandwich the respective spacers 100a and 100b, i.e., the gaps are opposite in the magnetic head of the stator side and in the magnetic head of the moving part side. With this arrangement, since the permanent magnets are used in the both magnetic heads and a plurality of magnetic poles are provided in each magnetic head, the transmission force is increased, and the drive force of the motor unit can be further increased. The structures of the magnetic heads on both the stator and moving part sides become the same, resulting in a cost reduction.

Figure 10A:
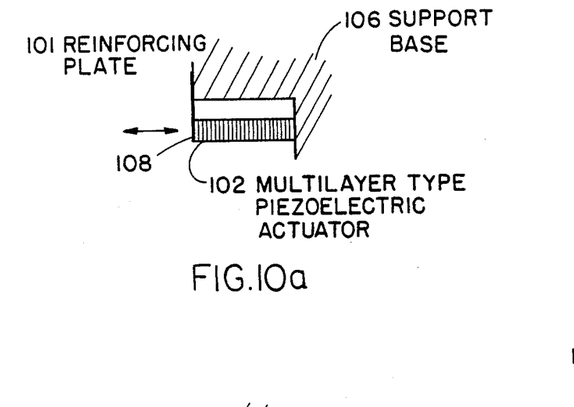
FIG. 10 shows views for explaining a method of mounting a reinforcing plate or wire applied to a multilayer type piezoelectric actuator used in the drive apparatus and the motor unit according to the present invention.
Figure 10B:
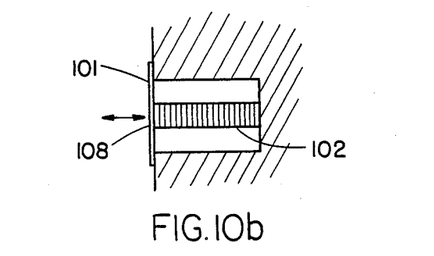
Figure 10C:
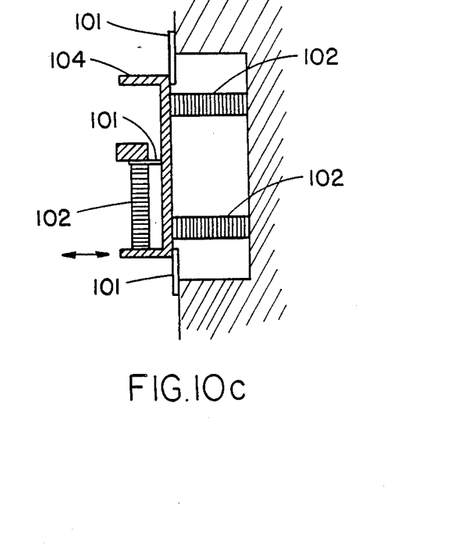

Most of the multilayer type piezoelectric actuators as one type of an actuator used in the motor unit having the above arrangement have a relatively small resistance against a load in the transverse direction, i.e., in a direction perpendicular to its moving direction. In order to increase the resistance, a reinforcing plate or wire made of a metal or a fiberglass reinforced plastic (FRP) may be inserted in a plane perpendicular to the moving direction of the actuator, as shown in FIGS. 10(a), 10(b), and 10(c). More specifically, when the reinforcing plate or wire is adhered or fixed between a multilayer type piezoelectric actuator 102 or a connection member 104 and a support base 106, the reliability of the motor unit can be increased while motion of the multilayer type piezoelectric actuator 102 in a direction other than a desired direction is restricted and while required motion of a drive end 108 is allowed.

Figure 11:
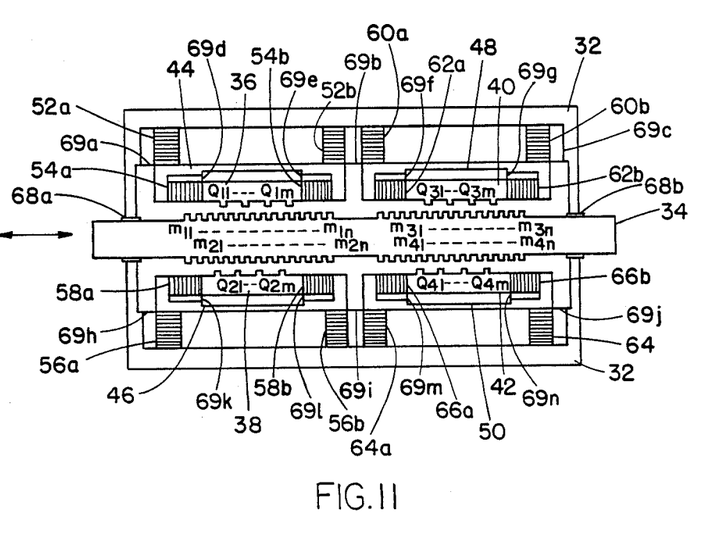
FIG. 11 is a sectional view for explaining a motor unit according to still another embodiment of the present which is obtained by mounting a reinforcing plate to the motor unit shown in FIG. 5.

FIG. 11 shows a structure of a motor unit obtained by providing reinforcing plates 69a, 69b,..., and 69n as described above to each actuator of the motor unit shown in FIG. 5.

The piezoelectric motor described above has the following drawbacks. (1) It requires a plurality of drive apparatuses as indicated by the term "relay". (2) When the step size of a moving part is to be minimized, the arrangements of the respective drive apparatuses and the phases of the drive signals must be strictly adjusted. (3) It is a synchronous motor. Therefore, the above piezoelectric motor is not suitable for braking or the like.

A drive apparatus according to still another embodiment of the present invention wherein the above limitations are removed will be described with reference again to FIG. 1.

More specifically, in this embodiment, AC voltages VP and VQ which have predetermined phases or which have different frequencies and are in synchronism with each other are applied to the actuators 10 and 14, respectively, of the arrangement shown in FIG. 1, so that the motion end Q of the actuator 14 performs a periodic motion along a specific closed curve trace.

For example, when the directions of the displacements of the piezoelectric actuators 10 and 14 having the same size and characteristics are caused to be perpendicular to each other and two sine waves $$Vx = A\sin\omega t$$
$$Vy = B\sin(\omega t + \pi/2)$$

having phases different from each other by 90° are applied as the voltages VQ and VP, the motion output end Q performs a cyclic motion along an ellipse $$(X/A)^2 + (Y/B)^2 = 1$$

Therefore, when a magnet is provided to the motion output end Q and the moving part is arranged to oppose the magnet, as shown in FIG. 12, the moving part can be driven in a non-contact manner.

Figure 12A:
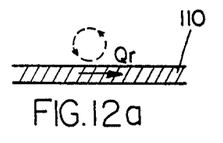
FIG. 12 shows views for explaining the respective types of drive methods using the apparatus shown in FIG. 1.
Figure 12B:
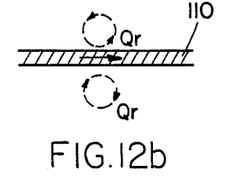
Figure 12C:
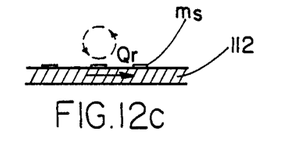
Figure 12D:
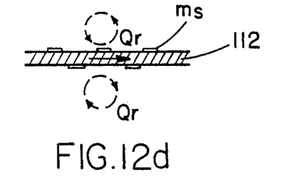

FIG. 12 shows different types of arrangements for converting the rotating motion on of the magnet into the linear motion of the moving part, in which FIGS. 12(a) and 12(b) show an arrangement of an induction linear motor and FIGS. 12(c) and 12(d) show an arrangement of a synchronous linear motor. Referring to FIG. 12, reference symbol Qr denotes a magnetic pole of a magnet mounted on a motion output end. Reference numeral 110 denotes a conductive moving part; and 112, a nonmagnetic moving part. Reference symbol ms denotes a magnetic pole mounted on the magnetic pole Qr side of the moving part 112.

Assume that the magnetic pole Qr moves along a trace of a small circle indicated by a broken line in FIG. 12. When the magnetic pole Qr moves to the right, the moving part 110 or 112 is electromagnetically coupled with the magnetic pole Qr. However, when the magnetic pole Qr moves to the left, the moving part 110 or 112 is not substantially coupled with the magnetic pole Qr. In other words, a substantially rightward travelling magnetic field is generated in the moving part 110 or 112 by the motion of the magnetic pole Qr, thereby realizing a motor unit wherein the moving member, i.e., the moving part can perform an infinite motion.

More specifically, in the motor unit shown in, e.g., FIG. 8, when the distal end of the magnetic head Qr is moved along a small circle within a plane including each central line of the multilayer member 90 of the moving part 34, as shown in FIG. 12, the moving part 34 can linearly move to the right or left in FIG. 12.

Figure 13:
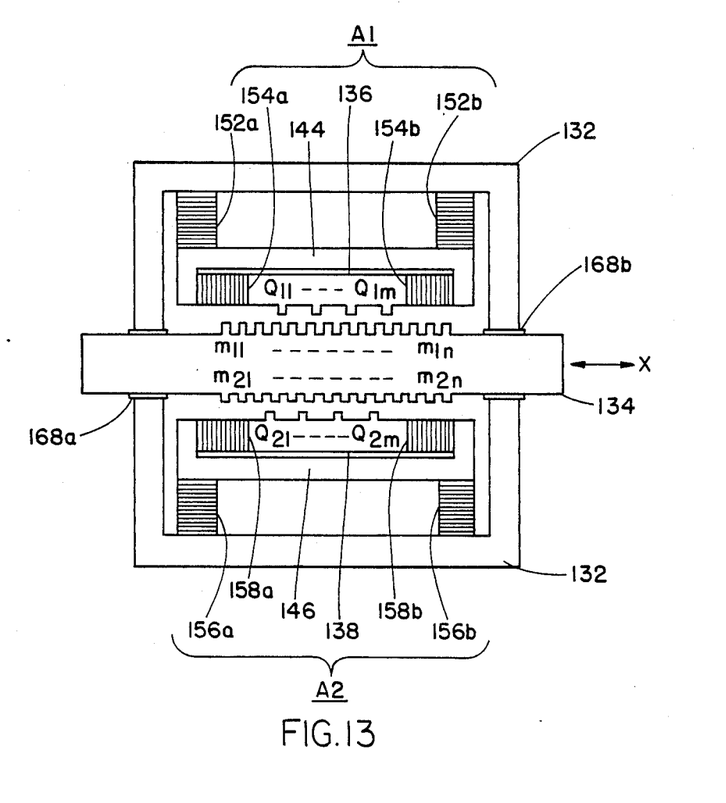
FIG. 13 is a sectional view for explaining a motor unit according to still another embodiment of the present invention.

FIG. 13 shows an embodiment of a motor unit of this type. The motor unit shown in FIG. 13 is a two-phase motor unit using two drive apparatuses A1 and A2, and has an outer frame 132, a moving part 134, stators 136 and 138, auxiliary stators 144 and 146, multilayer type piezoelectric actuators 152a and 152b; 154a and 154b; 156a and 156b; and 158a and 158b, bearings 168a and 168b, and the like. The actuators 152a and 152b are provided between the outer frame 132 and the auxiliary stator 144. The actuators 154a and 154b are provided between the auxiliary stator 144 and the stator 136. The actuators 156a and 156b are provided between the outer frame 132 and the auxiliary stator 146. The actuators 158a and 158b are provided between the auxiliary stator 146 and the stator 138. The bearings 168a and 168b are provided between the moving part 134 and the outer frame 132. The moving part 134 has magnetic poles m11, m12,..., and m1n; and m21, m22,..., and m2n. Magnetic heads Q11, Q12,..., and Q1m; and Q21, Q22,..., and Q2m are provided at portions of the stators 136 and 138 at an interval which is an integral multiple of the interval of the respective magnetic poles of the moving part 134 to oppose the magnetic poles of the moving part 134. The interval of the respective magnetic poles of the moving part 134 and that of the respective magnetic heads of the stators 136 and 138 can be the same.

The stator 136, the auxiliary stator 144, the multilayer type piezoelectric actuators 152a and 152b; and 154a and 154b, and the magnetic heads Q11, Q12,..., and Q1m constitute the drive apparatus A1 as the characteristic feature of the present invention, and the stator 138, the auxiliary stator 146, and the multilayer type piezoelectric actuators 156a and 156b; and 158a and 158b constitute the drive apparatus A2.

Figure 14:
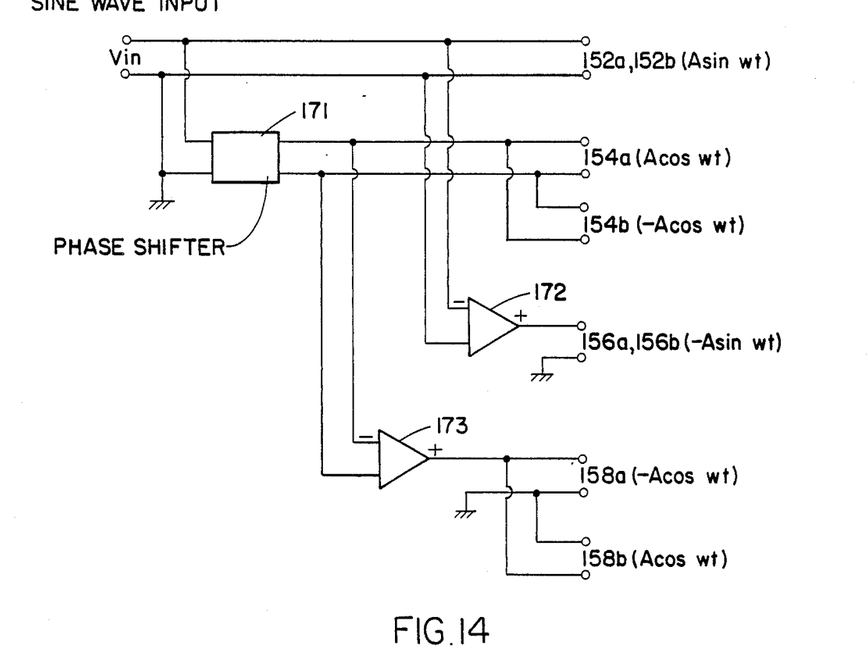
FIG. 14 is a circuit diagram showing a circuit for generating signal voltages applied to the respective portions of FIG. 13.

In the motor unit shown in FIG. 13, voltages having the same phases are applied to the actuators 152a and 152b; and 156a and 156b, respectively, as shown in FIG. 14. Voltages having phases opposite from each other are applied to the actuators 154a and 154b; and 158a and 158b, respectively. The frequencies of the voltages applied to the actuators 152a and 152b; 154a and 154b; 156a and 156b; and 158a and 158b are the same. The voltages applied to the actuator 154a (154b) and the actuators 152a and 152b, and the voltages applied to the actuator 158a (158b) and the actuators 156a and 156b are phase-shifted from each other by 90°. A phase difference $\phi$ ($\phi = 180°$ in this case) is provided between the voltages applied to the actuators 152a and 152b; and 156a and 156b, and between the actuators 154a and 154b; and 158a and 158b.

Such an AC drive voltage is obtained by directly inverting, or by phase-shifting and then inverting a sine wave input voltage Vin shown in FIG. 14. Referring to FIG. 14, reference numeral 171 denotes a phase shifter for shifting an input voltage by 90° and then outputting the phase-shifted voltage; and 172 and 173, inverters for inverting (phase-shifting by 180°) the input voltage and outputting the inverted voltages.

In the motor unit shown in FIG. 13, the moving part 134 is restricted to move linearly only in the X direction. The magnetic heads Q11, Q12,..., and Q1m; and Q21, Q22,..., and Q2m, of the motion output ends of the respective drive apparatuses A1 and A2 move in the same manner as the magnetic poles Qr shown in FIG. 12(d). The drive force is transmitted to the moving part 134 through magnetic coupling with the magnetic poles m11, m12,..., and m1n; and m21, m22,..., and m2n in a non-contact manner. In each of the drive apparatuses A1 and A2, the moving part 134 is driven only in the forward motion and not driven during the backward motion. Therefore, when only a single drive apparatus is used, the variation in the drive force is large. However, since the two drive apparatuses A1 and A2 are used to have phases shifted from each other by 180°, the drive force is smoothed.

As a moving part 134, one which does not have magnetic poles m11, m12,..., and m1n; and m21, m22,..., and m2n can be used. In this case, the motor unit is an induction motor. In an induction motor, a force supplied to a moving part from a drive apparatus is substantially proportional to the relative speed between the moving part and the magnetic pole of the drive apparatus. Therefore, the induction motor can drive and brake a moving part. As a result, the induction motor can be used as a high-precision position or speed control motor.

The moving part shown in FIG. 13 or 8 corresponds to a rotor of a general AC motor. Rotors having various types of structures used in the various types of AC motors for various objects can be employed as the moving parts for a similar object. For example, the multilayer member 90 can be removed from the moving part in the motor unit shown in FIG. 8 to provide an induction motor. Only the multilayer member 90 or a portion of the moving part on the magnetic head side can have a multilayer structure consisting of magnetic and nonmagnetic members, like a squirrel-cage motor, thereby short-circuiting the respective nonmagnetic spacers on two sides of the moving part, as well as connecting the respective magnetic elements on a side of the moving part opposite to the magnetic head, resulting in an improved transmission torque. Alternatively, like a so-called hysteresis motor, a material having a large hysteresis can be used as a magnetic material in the squirrel-cage motor so that the resultant motor has both a constant step size characteristic as that of a motor and a braking or drive characteristic as that of an induction motor.

Figure 15:
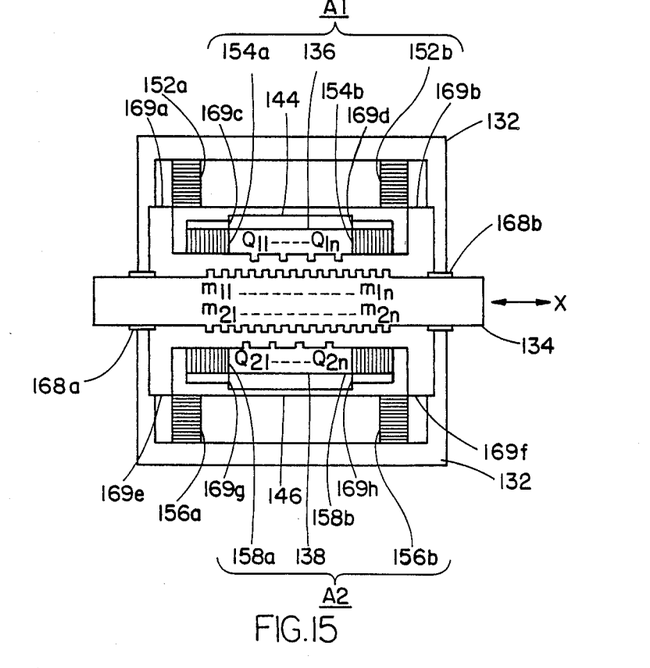
FIG. 15 is a sectional view for explaining a drive apparatus according to still another embodiment of the present invention which is obtained by providing a reinforcing plate to the motor unit shown in FIG. 13.

FIG. 15 shows the arrangement of a motor unit obtained by providing reinforcing plates 169a, 169b,..., and 169h described with reference to FIGS. 10(a) to 10(c) to the respective multilayer type piezoelectric actuators of the motor unit shown in FIG. 13.

Figure 16:
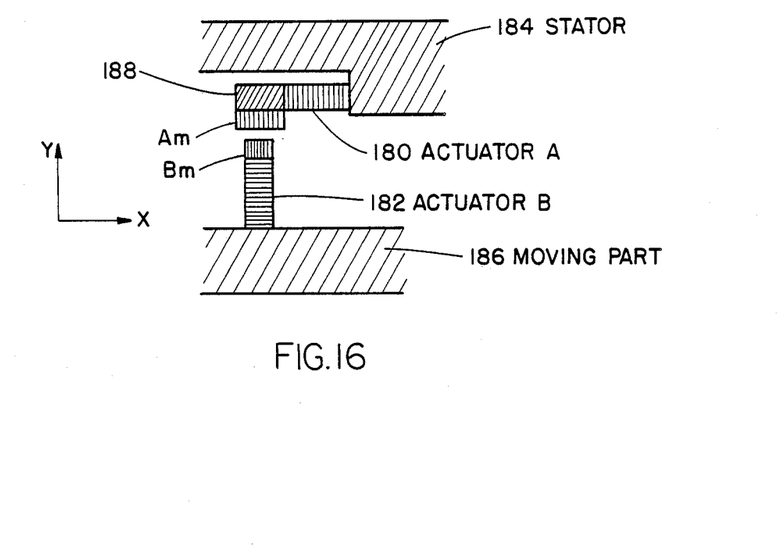
FIG. 16 is a sectional view for explaining a drive apparatus according to still another embodiment of the present invention.
Figure 17:
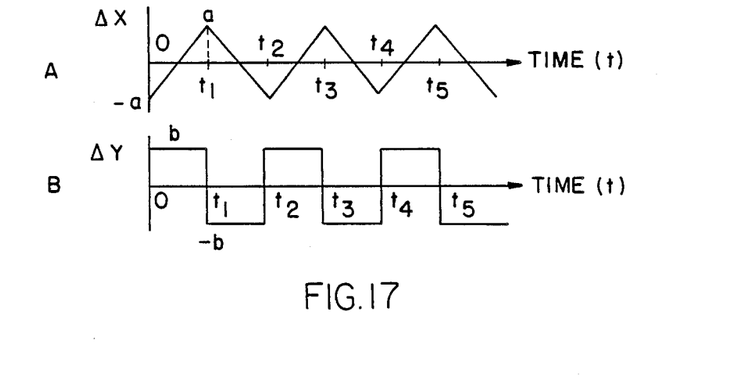
FIG. 17 shows, waveform charts for showing the drive signal applied to the motor unit shown in FIG. 16 and the displacements of the respective actuators.

FIG. 16 schematically shows the arrangement of a drive apparatus according to still another embodiment of the present invention. In the drive apparatus shown in FIG. 16, multilayer type piezoelectric actuators (A and B) 180 and 182 are mounted on, e.g., the drive member such as a stator 184 and a driven member such as a moving part 186, respectively, of a motor unit such that their moving directions are different from each other, e.g., perpendicular to each other. A magnetic pole Am is mounted on the distal end of the actuator 180 through a connection member 188, and another magnetic pole Bm is mounted on the distal end of the other actuator 182. With this arrangement, the magnetic poles Am and Bm oppose each other in a non-contact manner. The moving part 186 can move only in, e.g., an X (−X) direction, The actuators 180 and 182 of the drive apparatus shown in FIG. 16 are driven by AC signals that are in synchronism with each other. FIG. 17 shows examples of a signal waveform for driving the respective actuators, i.e., displaced waveforms of the respective actuators. Referring to FIG. 17, when time t=0, the displacement ΔY of the actuator B, i.e., the actuator 182 is b. At this time, the magnetic pole Bm of the actuator B is closest to the magnetic pole Am of the actuator A, i.e., the actuator 180, and the magnetic poles Am and Bm attract each other. Since the actuator A is displaced for a distance 2a from this state until time t1, the moving part 186 moves in the X direction for 2a. Displacement ΔY of the actuator B is −b from time t1 to t2. Since the gap between the magnetic poles Am and Bm is increased, the magnetic forces between them are negligibly small, and the motion of the actuator A is not transmitted to the moving part 186. During this period of time, the actuator A is displaced for −2a, i.e., shrinks for 2a. The magnetic pole Bm approaches the magnetic pole Am at time t2, and the actuator A is displaced by 2a until time t3. Therefore, the magnetic pole Bm moves in the X direction for 2a. When this operation is periodically repeated, the vibration of each of the actuators A and B can be converted into a linear motion of the moving part.

In the above arrangement, another element such as a magnetostrictive element can be used in place of each of the multilayer type piezoelectric actuators 180 and 182. The moving part 186 can be replaced by a stator and the stator 184 can be replaced by a moving part. The drive and driven members are interchangeable. The connection member 188 for coupling the actuator 180 and the magnetic pole Am is not always necessary, or two connection members can be used for connecting the actuators 180 and 182 with the poles, respectively. Furthermore, three actuators can be provided to a single drive apparatus and the displacements of the respective actuators can be coupled in a three-dimensional manner. The drive voltages of the respective actuators A and B are AC voltages that are in synchronism with each other. It is preferable that these AC voltages have phases such that when the actuator A is moved in the moving direction of the moving part, the coupling of the magnetic poles Am and Bm of the actuator B becomes maximum.

Figure 18:
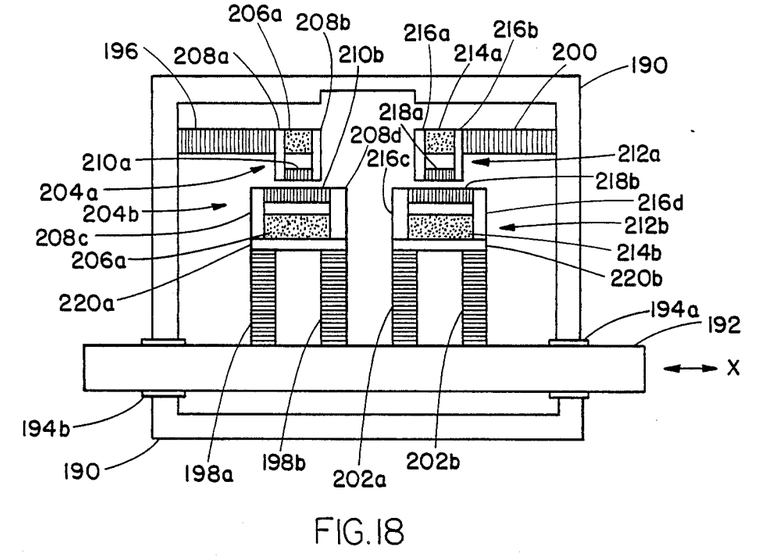
FIG. 18 is a sectional view for explaining a motor unit according to still another embodiment of the present invention which uses a drive apparatus based on the principle shown in FIG. 16.

FIG. 18 shows a motor unit according to still another embodiment of the present invention which has two drive apparatuses that are based on the principle described with reference to FIG. 16. The motor unit shown in FIG. 18 has a stator 190 serving also as an outer frame, a moving part 192 movable in the X direction, bearings 194a and 194b, and multilayer type piezoelectric actuators 196, 198a, 198b, 200, 202a, and 202b, the like. Magnetic heads 204a and 212a having the same structure as that of the magnetic head 92a shown in FIG. 9 are mounted on the distal ends of the actuators 196 and 200, respectively, mounted on the stator 190. The magnetic head 204a consists of a permanent magnet 206a, yokes 208a and 208b, and a magnetic pole 210a. The magnetic head 212a consists of a permanent magnet 214a, yokes 216a and 216b, and a magnetic pole 218a. The distal ends of the actuators 198a and 198b mounted on the moving part 192 are coupled through an auxiliary moving part 220a, and a magnetic head 204b having the same structure as that of the magnetic head 92b shown in FIG. 9 is mounted on the auxiliary moving part 220a. The magnetic head 204b consists of a permanent magnet 206a, yokes 208c and 208d, and a magnetic pole 210b. The distal ends of the actuators 202a and 202b are coupled through an auxiliary moving part 220b, and a magnetic head 212b consisting of a permanent magnet 214b, yokes 216c and 216d, and a magnetic pole 218b is mounted on the auxiliary moving part 220b. The magnetic heads 204a and 212a on the stator side respectively oppose the magnetic heads 204b and 212b on the moving part side at respective magnetic pole portions.

In the motor unit shown in FIG. 18, each drive apparatus performs driving in the manner as described above. When the drive phases of the respective drive apparatuses are shifted from each other, displacement of at least one drive apparatus can be constantly transmitted to the moving part. As a result, the drive force and the moving speed of the moving part can be set constant over time.

Figure 19:
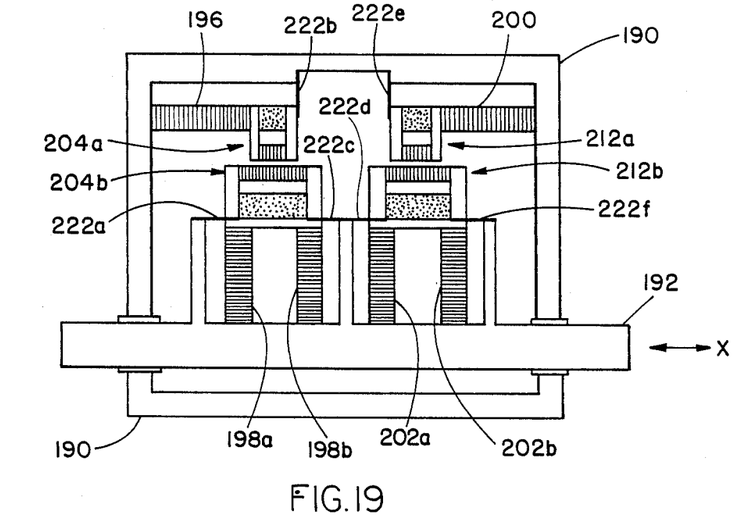
FIG. 19 is a sectional view for explaining a motor unit according to still another embodiment of the present invention which is obtained by providing a reinforcing plate in the motor unit shown in FIG. 18.

FIG. 19 shows a motor unit obtained by providing reinforcing plates 222a, 222b,..., and 222f as those described with reference to FIGS. 10(a), 10(b) and 10(c) to the respective multilayer type piezoelectric actuators of the motor unit shown in FIG. 18.

As described above, according to the present invention, a drive apparatus wherein the displacements of a plurality of actuators are synthesized at different angles is realized. Since operation in a small range of a given plane or line can be controlled, fine position control for, e.g., repeating operations or testing of a small portion can be performed. When the moving part is moved to find a predetermined position in a trial-and-error manner, the predetermined position can be searched while a three-dimensional operation is performed at a high speed. Therefore, positioning can be performed at a very high speed. When the voltages and phases of the actuators of the respective drive apparatuses are adjusted, positioning of the scanning line and changes of the location and the moving distance can be performed quite easily. When the motion of such a drive apparatus is transmitted to a moving part in a non-contact manner to convert a small motion into an infinite motion, a motor unit in which various problems of a conventional actuators such as abrasion, dust generation, heat generation, incorrect position due to slippage and backlash and damages due to overload are minimized and which has a resolution on the order of submicrons can be easily provided.

When the fine closed-curve periodic motion of a magnetic pole provided to a motion output end of the drive apparatus is transmitted to a moving part in a non-contact manner to be converted into an infinite motion, and especially when a moving part having a plurality of magnetic poles arranged in the moving direction on the drive apparatus side is to be driven, problems such as abrasion, dust generation, heat generation, slippage and backlash, and damages due to overload are minimized, resulting in driving with a resolution on the order of submicrons. In addition, even when a moving part is made of a nonmagnetic conductive material, it can be driven. In this case, since the force supplied to the moving part from the drive apparatus is substantially in proportion to the speed of the periodic motion in the tangential direction, the drive apparatus can be utilized for braking of the moving part, and high-precision positioning and speed control can be performed.

INDUSTRIAL APPLICATION

A drive apparatus according to the present invention and a motor unit using it can be used when fine position control on the order of submicrons is needed as in a case when position control of a wafer is performed in an exposure apparatus for manufacturing a semiconductor device.

I claim:

1. A motor unit which consists of: a moving part having a plurality of magnetic heads of multipole structure disposed along a moving direction thereof at respective predetermined intervals; a stator having a plurality of drive apparatuses which are disposed at respective prearranged intervals along the moving direction of said moving part to oppose said magnetic heads in a non-contact manner and which are provided with magnetic heads of a multipole structure opposing the moving part so as to drive said moving part; each of said drive apparatuses having two multilayer type piezoelectric actuators, having respective moving directions, said moving directions being perpendicular to each other and being driven by respective alternating current signals in synchronism with each other and having a displacement synthesizing mechanism which synthesizes the displacement of said actuators and which outputs the resultant displacement as a motion of said magnetic heads; and said drive apparatuses being driven by a multiphase alternating current power source to vibrate said magnetic heads substantially in a moving direction of said moving part, thereby causing said moving part to move along a curve or linearly.

2. A motor unit according to claim 1, wherein said magnetic head includes a first multilayer gap assembly obtained by repeatedly stacking a nonmagnetic material having a thickness of g and a magnetic material having a thickness of d to have two or more gaps, and said magnetic poles of said moving part are formed by a second multilayer gap assembly obtained by repeatedly stacking a magnetic material having a thickness of D and a nonmagnetic material having a thickness of G to have two or more gaps.

3. A motor unit according to claim 2, wherein said magnetic head has a permanent magnet in a magnetic circuit including said first multilayer gap assembly.

4. A motor unit according to claim 2, wherein dimensions of said first and second multilayer gap assemblies satisfy $d \geq G$ and $g \geq D$.

5. A motor unit according to claim 1, wherein a reinforcing plate or wire is provided to said multilayer type piezoelectric actuator to allow said multilayer type piezoelectric actuator to move only in a substantially predetermined direction.

6. A motor unit according to claim 1 wherein said magnetic poles have magnetic heads having a plurality of gaps, and said magnetic heads are arranged such that gaps thereof are opposite each other.

7. A motor unit according to claim 6, wherein said magnetic heads have the same gap structure.

8. A motor unit according to claim 6, wherein each of said magnetic heads has a multilayer gap assembly including a plurality of gaps formed by repeatedly stacking a nonmagnetic material and a magnetic material, and a permanent magnet is provided in a magnetic circuit including said multilayer gap assembly.

9. A motor unit consisting of a stator, a moving part, and a plurality of drive apparatuses, each of said drive apparatuses is distributed along a moving direction and has: a plurality of multilayer type piezoelectric actuators, some of said actuators being arranged on the stator and the other actuators being arranged on the moving part, the moving directions of said actuators are perpendicular to each other, and said actuators are driven by alternating current signals which are in synchronism with each other; a plurality of magnetic heads of multipole structure, some of said magnetic heads being mounted on said actuators arranged on the stator and the others of said magnetic heads being mounted on said actuators arranged on the moving part, said magnetic heads mounted on said actuators arranged on the stator and said magnetic heads mounted on said actuators arranged on the moving part oppose to each other in a non-contact manner; and the actuators of said drive apparatuses are driven by multiphase alternating current signals whereby coupling with the magnetic heads mounted on said actuators arranged on said stator or coupling with the magnetic heads mounted on said actuators arranged on said moving part is maximum when the moving direction of said actuators arranged on said stator or said actuators arranged on said moving part substantially coincides with that of said moving part or said stator, respectively.

10. A motor according to claim 1, wherein a reinforcing plate or wire is provided to each of said multilayer type piezoelectric actuators to allow said multilayer type piezoelectric actuators to move only in a substantially predetermined direction.

11. A motor unit according to claim 9, wherein at least one of said actuators is a magnetostrictive actuator.

12. A motor unit according to claim 9, wherein said non-contact power transmitting mechanism is a magnetic power transmitting mechanism having magnetic poles and for magnetically coupling displacements of said actuators.

13. A motor unit according to claim 12, wherein said magnetic power transmitting mechanism has at least one magnetic head, and said magnetic poles are formed on two ends of a gap of said magnetic head.

14. A motor unit according to claim 13, wherein said magnetic power transmitting mechanism has two magnetic heads each having a plurality of gaps, and said magnetic heads are arranged such that gaps thereof oppose each other.

15. A motor unit according to claim 14, wherein said magnetic, heads have the same gap structure.

16. A motor unit according to claim 13 wherein said magnetic head has a multilayer gap assembly including a plurality of gaps formed by repeatedly stacking a nonmagnetic material and a magnetic material, and a permanent magnet is provided in a magnetic circuit including said multilayer gap assembly.

17. A motor unit according to claim 13, wherein said magnetic power transmitting mechanism has a plurality of magnetic poles on a side opposing the gaps of said magnetic head.

18. A motor unit according to claim 17, wherein said magnetic head includes a first multilayer gap assembly obtained by repeatedly stacking a nonmagnetic material having a thickness of g and a magnetic material having a thickness of d to have two or more gaps, and said magnetic poles of said moving part are formed by a second multilayer gap assembly obtained by repeatedly stacking a magnetic material having a thickness of D and a nonmagnetic material having a thickness of G to have two or more gaps.

19. A motor unit according to claim 18 wherein said magnetic head has a permanent magnet in a magnetic circuit including said first multilayer gap assembly.

20. A motor unit according to claim 18, wherein dimensions of said first and second multilayer gap assemblies satisfy $d \geq G$ and $g \leq D$.

* * * * *